Figure 3:
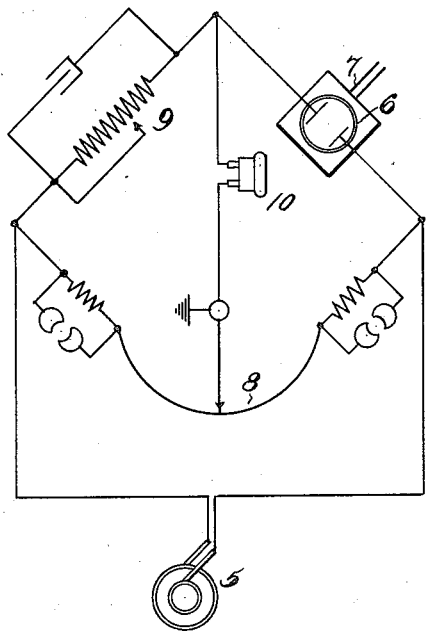

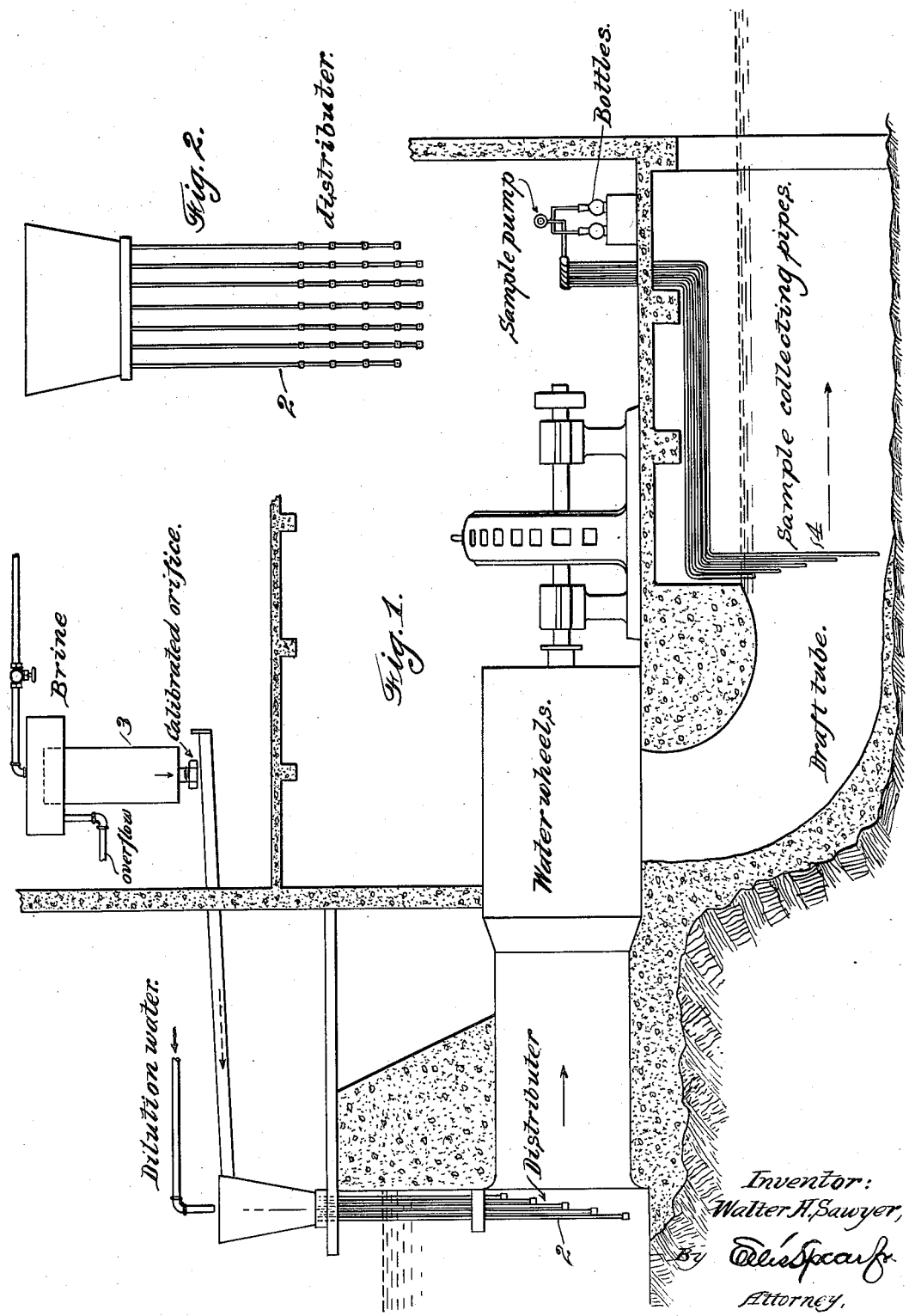

W. H. SAWYER.
METHOD OF MEASURING FLOWING WATER.
APPLICATION FILED SEPT. 10, 1915.

1,200,653.

Patented Oct. 10, 1916.

Inventor:
Walter H Sawyer;
By
Attorney.

UNITED STATES PATENT OFFICE.

WALTER HOWARD SAWYER, OF AUBURN, MAINE.

METHOD OF MEASURING FLOWING WATER.

1,200,653.      Specification of Letters Patent.      Patented Oct. 10, 1916.

Application filed September 10, 1915. Serial No. 49,904.

*To all whom it may concern:*

Be it known that I, WALTER H. SAWYER, a citizen of the United States, residing at Auburn, county of Androscoggin, State of Maine, have invented certain new and useful Improvements in Methods of Measuring Flowing Water, of which the following is a specification.

This invention relates to the determination of the amount of flowing water and particularly to a method for ascertaining the volume of water used by a water turbine as the basis of calculation of the amount to be paid by power users to the owners of water rights and as the basis for computing the efficiency of turbines.

The gaging of streams by ascertaining the area of cross section and computing the volume by multiplying this area by the velocity of the flowing water is old. In this method the velocity is found by means of floats, Pitot tubes or current meters. All of these methods, as well as the methods by the use of weirs or of rating curves prepared from measurements of cross section and velocity have proven inadequate or expensive for many water powers.

The general problem of the engineer has been complicated by the increase in the volumes to be measured and the development of modern business with its careful basis of valuation and its strict calculation of cost has rapidly raised the requirement of accuracy until errors of more than one tenth of one per cent. now represent serious factors in determining the value of a water power unit. Briefly the cost of weir instalment or of correct current meter measurements and the general difficulties of physical measurement or chemical analysis have all proven obstacles which often render the accurate determination of volume of water impossible or excessively expensive.

My present invention relates to the determination of flow by the dilution method in which I have overcome the objectionable features of chemical analysis which have frequently proven unsatisfactory on account of the presence of manufacturing waste or other impurities in many streams.

Briefly my invention relates to the discovery that the degree of dilution may be most accurately ascertained by calculation based on the electrical impedance of an electrolyte present in representative samples after the introduction of a strong solution of electrolyte in known volume and rate into a stream. Such method avoids the difficulties due to the presence of impurities which segregate upon evaporation or which retard, disguise, or prevent the determination of the end of the reaction under chemical treatment. Its limitations as I have determined them are in the perfection of the source of alternating current by which impedance is determined and in the apparatus used for determining the same, as most clearly discussed and explained by Professors C. W. Washburn and J. E. Bell in their article entitled "Improved apparatus for measuring the conductivity of electrolytes" which was published in the *Journal of the American Chemical Society* in February, 1913, and which apparatus I have found particularly useful in connection with my present invention.

In the drawings a form of apparatus is diagrammatically illustrated, in which—

Figure 1 shows an arrangement of means for distributing a strong solution and means for taking samples from the stream. Fig. 2 is an elevation of the distributing head, and Fig. 3 illustrates, in diagram, an impedance testing means.

My invention as compared with known methods and formulæ is simple and accurate. It consists in introducing a solution of an electrolyte in known quantity into the stream. This is best accomplished by use of a solution of common salt (NaCl) of known saturation pumped into the stream at a known rate through a transverse pipe system 2 which will distribute the solution uniformly throughout the whole cross section of the stream. The pipe system is supplied by a rate of flow regulating device 3. After the solution has been uniformly distributed and completely diffused, a sample or a composite characteristic sample may be taken by suitable means; for example, collecting pipes 4, and analyzed. The determining factor is the amount of electrolyte present in the sample. As suggested above, this amount may be best determined by the determination of the impedance of the solution to the passage of an alternating electric current. An alternating electric current is necessary for this purpose, as any current produced by polarization of the electrodes, if direct current is used, is fatal to accurate results. To this end I have utilized a generator delivering a high frequency current which I find satisfactory. It is necessary that the current be truly balanced in polarization, as an unbalanced current, such as that produced by an induction coil, produces polarization which, while not as active as that produced by a direct current is still fatal to accuracy.

While the problems above mentioned have been discussed by engineers and while some extremely creditable work in the line of chemical measurement has been accomplished by engineers engaged on water power measurement, it may be convenient to discuss somewhat more fully in detail, the general conditions and manner of meeting them. The so-called chemical method of measurement of water has been found satisfactory in many places where it was impracticable to measure the flow by ordinary methods. As the chemical method is also a dilution method it may be noted briefly that it consists in introducing into a stream above the point of measurement, a nearly saturated solution of salt at a known rate, great care being exercised to obtain a thorough mixture of the solution with the running water. Samples of the stream after thorough mixture are taken, care also being exercised to secure a characteristic or average sample. Samples of the concentrated solution used on the stream above, are then reduced by the addition of accurately measured quantities of distilled water, and the samples of water from the point of measurement are concentrated by evaporation so that the two solutions contain approximately the same amount of salt, the exact relative amount in the solutions being ascertained by titrating the same with a solution of nitrate of silver, in the presence of potassium chromate as an indicator. The flow of water is then found by the rule, that the flow of water to be measured is to the rate of flow of strong solution introduced into the stream as is the amount of salt contained in a known volume of the original solution to that contained in the same volume of the final samples, after subtracting from this latter the amount of salt originally contained in the water to be measured. There are some difficulties in obtaining reliable results by a utilization of this method, especially on streams where manufacturing wastes are discharged into the river. Such waste frequently consists of paper pulp, sulfite liquor containing all of the lignin originally in the wood from which the sulfite pulp is manufactured, lime waste from soda causticizing tanks, together with waste containing some carbonate of soda resulting from the burning of wastes for the recovery of soda in the soda process of pulp manufacture, waste dyestuffs, wool scourings, and ordinary household sewage. At times water in such rivers as the Androscoggin in Maine is decidedly acid, a condition which prevents successful titration. Evaporation of such water usually results in a dark, muddy solution which can not be titrated with nitrate of silver to give the characteristic red color reaction in the presence of potassium chromate when all the salt is changed to silver chlorid. Attempts have been made to clarify such waters by removing the coloring matter and suspended solids, as by the use of aluminum-hydroxid with subsequent filtration. The resultant filtrate was comparatively colorless but the use of aluminum hydroxid resulted in a loss of salt, which made the results inaccurate. Other chemical methods have been attempted, but all such methods are open to objection on account of the difficulties involved and the great length of time required for evaporation.

In order to overcome the above difficulties I devised my present invention which I base on a comparison of the electrical impedance to the passage of an alternating current of electricity in the samples. Matters soluble in water will increase the conductivity or reduce the impedance but not in direct proportion to the amount of electrolyte in the solution. Standard curves, however, may be plotted on rectangular coördinate paper from characteristic tests of solutions containing known quantities of electrolyte, and the amount of electrolyte in samples containing an unknown amount may be found by reference to the curves.

In testing impedance the use of a current with many alternations per second is a matter of great importance. The apparatus utilized preferably consists of a high frequency electric generator 5, Fig. 3, capable of generating a current at from 450 to 1,800 cycles per second. The water to be tested is placed in a conductivity cell 6, the electrodes of which are small platinum plates placed at different distances apart, depending upon the strength of the solutions, great care being taken to fill the cells to exactly the same point for each test.

As the conductivity of any solution is greatly influenced by the temperature, great care must be taken in maintaining a constant temperature in the cell. This is accomplished by placing the cell in water contained in a thermostat 7, this being provided with a stirring apparatus and heated by a gas flame controlled by an automatic gas regulator which will hold the temperature steady within less than one-fiftieth of a degree C. The current from the alternating high frequency machine is led through the solution in the cell to a Wheatstone bridge 8. This bridge should preferably have a considerable length of wire. I have secured very accurate results in a bridge having an equivalent wire length of fifty-five meters.

In operating the apparatus, the bridge and connecting resistance coils are so adjusted that the current passing through the electrolyte and one arm of the bridge is balanced by the current passing through the other arm of the bridge and standardized resistance coils 9. The point of balance is recognized by the absence of sound in two telephone receivers of which one is shown at 10 connected with the wiring of the bridge and tuned to respond to the frequency of the current.

As stated above, the temperature of the electrolyte is maintained as nearly constant as possible, the actual temperature being ascertained by the thermometer inserted in the liquid in the thermostat. By employing a thermometer divided to one-tenth of a degree centigrade and by making the reading with a microscope, temperature can be estimated to one one-hundredth of a degree. By this method it is possible to measure accurately a difference of one part of salt in ten million in comparatively strong solutions or in weak solutions one part of salt in one hundred million.

Bearing in mind the conditions and methods above suggested, the manner of procedure to be followed consists in running into the stream a known quantity of strong solution of brine, at a known rate, thoroughly distributing the same as in the measurement of water by chemical means. At some proper point after complete dilution is effected, carefully averaged samples are taken from the stream. Samples of the strong solution of brine are reduced by the addition of distilled water to a convenient concentration and tested in the apparatus above described. Samples of the water from the stream after mixture at the measuring station are also tested, all at a stated temperature, preferably 30 degrees C.

Samples of the water are placed in the conductivity cell and the impedance of each is measured. The impedance found is then referred to a table or diagram which has been previously prepared by experiment and from this table or diagram the quantity of salt contained in the strong solution and in the weak solution can be found. The quantity of water to be measured is then found by the rule that the volume of flowing water per unit of time is to the volume of strong solution of electrolyte introduced in the same unit of time as is the amount of electrolyte in a given volume of strong solution to the amount of electrolyte in the same volume after mixture of the strong solution with the water to be measured.

A proper deduction must of course be made for the natural electrolyte equivalent originally contained in the water to be measured, as the impedance of electrolyte originally contained in the water to be measured will affect the results, and it was found that the impedance of the original water could be translated into terms of the electrolyte used and subtracted from the apparent amount of electrolyte present with a high degree of accuracy.

The following is given as an illustrative problem:

Let $E_1$ represent the amount of electrolyte (in parts per million) originally contained in the water to be tested.

Let $E_2$ represent the amount of electrolyte (in parts per million) in the strong solution of the electrolyte to be introduced at a known rate into the water to be measured.

Let $E_3$ represent the amount of electrolyte (in parts per million) in the solution after the introduction of the strong electrolyte.

Let $Q_1$ represent the rate in cubic feet per second at which the initial strong solution, $E_2$ is introduced into the water to be measured.

Let $Q_2$ represent the rate of flow of the water to be measured.

The proportion then becomes $$Q_1 : Q_2 :: (E_3 - E_1) : E_2$$

or $$Q_2 = \frac{E_2}{E_3 - E_1} \times Q_1$$

Let $E_1 = 10$ parts of salt per million.
Let $E_2 = 100,000$ parts of salt per million.
Let $E_3$ or the sample of water to be measured $= 120$ parts of salt per million.

Assume that the initial strong solution $E_2$ was introduced into the stream at the rate of 0.26 cu. ft. sec. $= Q_1$.

Then $$Q_2 = \frac{100,000}{120 - 10} \times 0.26 = 236.36 \text{ cu. ft. sec.}$$

The discussion above given is made somewhat detailed for the purpose of a full disclosure but I wish it understood that while I consider the details valuable as given, the method may obviously be varied and for the purposes of my protection insist that all modifications within the limits of the appended claims are to be included as my invention.

What I therefore claim and desire to secure by Letters Patent is:

1. The method of measuring flowing water by adding thereto at a known rate, a strong solution of an electrolyte, whose proportion of electrolyte is known, ascertaining the amount of electrolyte in the water to be measured both before and after the addition of said strong solution by comparing its impedance to the passage of an alternating current of electricity with the impedance to the passage of an alternating current of electricity through solutions containing known amounts of electrolyte and subsequently computing the amount of flowing water by the rule that the rate of flow of the water to be measured is to the rate of flow of the solution of electrolyte as is the amount of electrolyte in the initial solution to the amount of electrolyte equivalent in the water to be measured less the amount of electrolyte equivalent originally contained in the water to be measured.

2. The method of measurement of flowing water by adding thereto electrolyte in known amount and rate, and in testing the water after a complete mixture has been effected by determining its impedance to the passage of an alternating current of electricity to determine the amount of electrolyte in the dilute solution and in figuring the volume of the flowing water by its proportion to the amount of known electrolyte introduced to the amount of electrolyte in the dilute solution.

3. The method of measuring flowing water by adding thereto at a known rate, a strong solution of electrolyte whose proportion of electrolyte is known, ascertaining the amount of electrolyte in the water to be measured both before and after the addition of the said strong solution by comparing its impedance to the passage of an alternating current of electricity with the impedance to the passage of an alternating current of electricity through solutions containing known amounts of electrolyte and subsequently computing the amount of flowing water by the rule that the rate of flow of the water to be measured is to the rate of flow of the solution of electrolyte as is the amount of electrolyte in the initial solution to the amount of electrolyte equivalent in the water to be measured, less the amount of electrolyte originally contained in the water to be measured, and subtracting the rate of flow of the solution of the electrolyte to find the original volume of the flow of the water.

4. The dilution method of measurement of flowing water comprising adding to the flowing water, at a known rate, an electrolyte of known strength, and determining the rate of flow by comparing the concentration of the original electrolyte with that of the resulting weak solution by measuring their respective specific resistances to the flow of an electric current and comparing said resistances.

5. The measurement of flowing water by adding at a known rate a known quantity of strong electrolyte of known impedance in solution, to the flowing water to be measured, and distributed substantially uniformly through a given cross-section of the body of water, taking an average sample from the stream below the place of addition of the strong solution, determining the proportion of electrolyte in the sample by ascertaining its impedance to the passage of an alternating current of electricity, and finding the ratio of dilution as between the mixture and the solution by comparing relative impedances.

6. The method of measuring the flow of a stream of water which consists in adding to the stream at a predetermined rate, a strong solution of electrolyte, determining the amount of electrolyte in the strong solution by comparing its impedance to the passage of an alternating current of electricity with the impedance to the passage of electricity in solutions containing known quantities of electrolyte, in determining the amount of electrolyte in samples from the stream after thorough admixture with the added solution and utilizing the data thus obtained to determine the flow.

7. The measurement of flowing water by first measuring its impedance to a current of electricity, then adding to the flowing water at a known rate an electrolyte of known strength, determining the impedance of the mixture to a current of electricity to find the amount of electrolyte in the dilute solution, and in ascertaining the ratio of the concentration of the electrolyte in the mixture to that of the known electrolyte introduced.

In testimony whereof I affix my signature in presence of two witnesses.

WALTER HOWARD SAWYER.

Witnesses:
 Edward G. Lee,
 A. B. Andrew.